3,534,022
1-SULFONYL-5,5-DISUBSTITUTED HYDANTOINS
AND PROCESSES FOR PREPARATION THEREOF
Susumu Umemoto, Sakai-shi, Yasuhisa Nakamura, Kobe-shi, and Keiji Nakamura, Amagasaki-shi, Japan, assignors to Dainippon Pharmaceutical Co., Ltd., Osaka, Japan, a corporation of Japan
No Drawing. Filed Feb. 13, 1967, Ser. No. 615,322
Claims priority, application Japan, Feb. 17, 1966,
41/9,718, 41/9,719
Int. Cl. C07d 49/32; A01n 9/22
U.S. Cl. 260—239.9                                    20 Claims

ABSTRACT OF THE DISCLOSURE

1 - sulfonyl-5,5-disubstituted hydantoins such as 1-benzenesulfonyl-5,5-diphenyl hydantoin, and salts thereof, which have excellent anti-inflammatory activity. These compounds also exhibit antipyretic activity. The reaction of 5,5-disubstituted hydantoin and sulfonyl halide yields, depending on the reaction conditions, the corresponding 3 - sulfonyl compound and/or 1,3 - disulfonyl compound. The 3-sulfonyl compound can be rearranged by the action of alkali to the corresponding 1-sulfonyl compound. The 1,3-disulfonyl compound can be converted to the corresponding 1-sulfonyl compound by partial splitting off of the sulfonyl group.

---

This invention relates to a group of novel 1-sulfonyl-5,5-disubstituted hydantoins and their pharmaceutically acceptable salts, and processes for their preparation.

The 1-sulfonyl-5,5-disubstituted hydantoins of the invention are represented by the formula

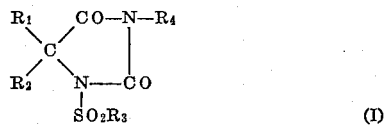

(I)

wherein $R_1$ and $R_2$ each represents a member selected from phenyl and lower alkyl (preferably of 1–4 carbon atoms) or may together form a 5- or 6-membered cycloaliphatic ring with the carbon atom at 5-position of the hydantoin nucleus; $R_3$ represents a member selected from lower alkyl (preferably of 1–4 carbon atoms), phenyl and substituted phenyl, said substituent on the phenyl being selected from lower alkyl (preferably of 1–4 carbon atoms) nitro, halogen (preferably chlorine or bromine), amino, hydroxy, lower alkoxy (preferably of 1–4 carbon atoms) and phenylalkoxy (preferably of which alkoxy moiety being of 1–2 carbon atoms; and $R_4$ represents a member selected from hydrogen, alkyl (preferably of 1–4 carbon atoms), alkanoyl (preferably of 2–5 carbon atoms) benzoyl and alkoxycarbonyl (preferably of 2–5 carbon atoms).

Examples of the novel 1-sulfonyl-5,5-disubstituted hydantoins of the Formula include:

1-ethanesulfonyl-5,5-diphenyl hydantoin
1-benzenesulfonyl-5-ethyl-t-phenyl hydantoin
1-(p-nitrobenzenesulfonyl)-5,5-dimethyl hydantoin
1-ethanesulfonyl-5-ethyl-5-phenyl hydantoin
1-benzenesulfonyl-5,5-diphenyl hydantoin
1-ethanesulfonyl-5,5-dimethyl hydantoin
1-ethanesulfonyl-5,5-pentamethylene hydantoin
1-benzenesulfonyl-5,5-dimethyl hydantoin
1-benzenesulfonyl-5,5-pentamethylene hydantoin
1-(p-nitrobenzenesulfonyl)-5,5-diphenyl hydantoin
1-(p-nitrobenzenesulfonyl)-5-ethyl-5-phenyl hydantoin
1-(p-toluenesulfonyl)-5,5-diphenyl hydantoin
1-(p-toluenesulfonyl)-5-ethyl-5-phenyl hydantoin
1-(p-aminobenzenesulfonyl)-5,5-diphenyl hydantoin
1-(p-methoxybenzenesulfonyl)-5,5-diphenyl hydantoin
1-(p-chlorobenzenesulfonyl)-5,5-diphenyl hydantoin
1-(p-benzyloxy-benzenesulfonyl)-5,5-diphenyl hydantoin
1-(p-hydroxybenzenesulfonyl)-5,5-diphenyl hydantoin
1-(m-nitrobenzenesulfonyl)-5,5-diphenyl hydantoin
1-(o-toluenesulfonyl)-5,5-diphenyl hydantoin
1-benzenesulfonyl-3-methyl-5,5-diphenyl hydantoin
1-benzenesulfonyl-3-ethoxycarbonyl-5,5-diphenyl hydantoin
1-benzenesulfonyl-3-acetyl-5,5-diphenyl hydantoin.

These novel 1-sulfonyl-5,5-disubstituted hydantoins and their pharmaceutically acceptable salts exhibit better, or at least equal, anti-inflammatory activity when compared with known anti-inflammatory agents such as phenylbutazone and aminopyrine. Furthermore, the compounds of the invention possess less toxicity compared with known anti-inflammatory agents, and exhibits substantially no objectionable side-effects such as gastro-intestinal disorders and emesis. Again the compounds of the invention possess equal or better antipyretic activity compared with known antipyretics with analgesic activity such as aspirin, phenylbutazone and aminopyrine. Therefore the compounds of the invention will be highly useful as anti-inflammatory agent, antipyretic and analgesic.

According to one feature of the invention, a number of the compounds of the Formula I in which $R_4$ is hydrogen, i.e., the 1-sulfonyl compounds of the formula

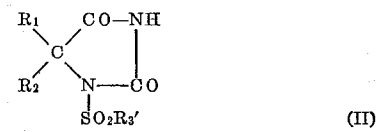

(II)

wherein $R_1$ and $R_2$ have the signification as defined in the above; and $R_3'$ is a member selected from lower alkyl (preferably of 1–4 carbon atoms), phenyl and substituted phenyl, said substituent on the phenyl being selected from lower alkyl (preferably of 1–4 carbon atoms) nitro, halogen (preferably chlorine or bromine), lower alkoxy (preferably of 1–4 carbon atoms) and phenylalkoxy (preferably of which alkoxy moiety being of 1–2 carbon atoms), can be obtained in the form of alkali metal salt by the process comprising subjecting the corresponding 3-sulfonyl compounds of the formula

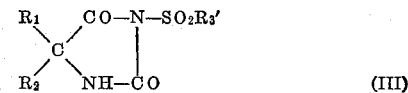

(III)

to a temperature within the range of 15°–200° C. in an inert solvent in the presence of an alkali metal reagent selected from hydrides, hydroxides, amides and alcoholates of alkali metals. And, treating the said salt with an acid, for example hydrochloric acid, the 1-sulfonyl hydantoin of the Formula II is obtained.

Suitable alkali metal reagent for the above alkaline rearrangement being as defined in the above, use of alkali metal hydrides such as sodium hydride and lithium hydride is particularly advantageous. Examples of suitable inert solvent include ether, benzene and xylene.

The 1-sulfonyl compounds of the Formula II can also be prepared in accordance with another feature of the invention, by the process comprising reacting 1,3-disulfonyl compound of the formula

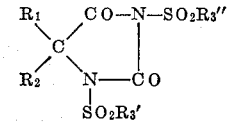

wherein $R_1$, $R_2$ and $R_3'$ have the signification as priority defined, and $R_3''$ is same or different from $R_3'$, having the same signification as of $R_3'$ with an acid or a base at a temperature within the range of 15°–200° C., thereby splitting off its sulfonyl group at 3-position. It is quite surprising that the sulfonyl group at 3-position alone of the 1,3-disulfonyl compounds can be split off by the action of acid or base.

Normally those acids and bases known to be appropriate for splitting off of acyl group are useful for the above reaction of the invention.

After completion of the reaction, by recrystallizing the product from suitable solvent such as methanol, ethanol, acetone, dioxane or a mixture of the foregoing with water, the 1-sulfonyl compound of the Formula II can be recovered as free acid.

The other group of reagents suitable for splitting off the sulfonyl group at 3-position of the 1,3-disulfonyl compound of Formula IV in accordance with the invention consists of hydroxides, carbonates, bicarbonates and alcoholates of alkali metals such as sodium hydroxide, potassium hydroxide, sodium carbonate, potassium carbonate, sodium bicarbonate and sodium ethylate; and hydroxides of alkaline earth metals such as barium hydroxide and calcium hydroxide. These reagents are used in an amount of about 1 to 5 mols per mol of the disulfonyl compound of Formula IV, as an aqueous or alcoholic solution of 1–5 wt. percent with advantage. The reaction is carried out preferably at about 50–110° C. As the result this alkaline hydrolysis, the 1-sulfonyl compound of Formula II is obtained as the corresponding metallic salt. The treatment of the said salt with an acid gives the free acid of Formula II.

Still another group of reagents suitable for splitting off the sulfonyl group at 3-position of the 1,3-disulfonyl compound of Formula IV in accordance with the invention consists of amines, including ammonia, primary amines such as methylamine, ethylamine and aniline, and secondary amines such as dimethylamine, diethylamine and morpholine. These amines are preferably used in an amount of about 2–5 mols per mol of the disulfonyl compound of Formula IV as a solution in a suitable solvent such as methanol, ethanol, acetone, benzene or in a mixture of the foregoing with water. As the result of the sulfonyl group-splitting reaction, the 1-sulfonyl compound of Formula II is obtained as amine adduct, of which treatment with an acid giving the compound of Formula II.

The 1-sulfonyl compound of Formula II or alkali metal salt thereof can be converted to the other compounds within the scope of Formula I by the means known per se.

The compound of Formula I in which $R_4$ is a lower alkyl can be readily obtained in accordance with the means known per se, for example, by reacting the compound of Formula II with a dialkyl sulfate such as dimethyl sulfate and diethyl sulfate, or by reacting the alkali metal salt of the compound of Formula II with an alkyl halogenide such as methyl iodide and ethyl bromide.

The compound of Formula I in which $R_4$ is a lower alkanoyl or benzoyl can be obtained in accordance with the means known per se, for example, by reacting the compound of Formula II with an acid anhydride such as acetic anhydride and propionic anhydride, or by reacting the alkali metal salt of the compound of Formula II with an acyl halide such as acetyl chloride, propionyl chloride and benzoyl chloride.

The compound of Formula I in which $R_4$ is an alkoxycarbonyl can be obtained in accordance with the means known per se, for example by reacting the alkali metal salt of the compound of Formula II with an alkyl chloroformate such as ethyl chloroformate.

The compound of Formula I in which $R_3$ is aminophenyl or hydroxyphenyl may be obtained from the corresponding compound in which $R_3$ is nitrophenyl or benzyloxyphenyl in accordance with the means known per se, for example, by catalytic reduction.

The starting materials of the above processes, i.e., the 3-sulfonyl-5,5-disubstituted hydantoins of Formula III and 1,3-disulfonyl-5,5-disubstituted hydantoins of Formula IV have never been the subject of prior disclosure within out knowledge. The 3-sulfonyl compound of Formula III and 1,3-disulfonyl compound of Formula IV in which $R_3'$ and $R_3''$ are the same can be prepared by reacting the hydantoins of the formula

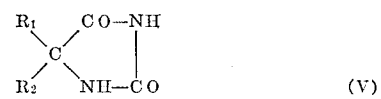

(V)

in the form of alkali metal salt thereof, or in the presence of dehydrohalogenation agent, with sulfonyl halide of the formula $R_3'SO_2$—X (in which X represents halogen and $R_3'$ has the signification as priorly defined) in accordance with the means known per se.

The reaction of the alkali metal salt of hydantoins of Formula V with the said sulfonyl halide is preferably carried out in a suitable solvent such as ether, benzene, n-hexane, xylene, acetone and ethanol, at temperatures ranging about 15°–200° C., advantageously at the reflux temperature of the solvent. With this reaction normally a mixture of the 3-sulfonyl compound of Formula III and the 1,3-disulfonyl compound of Formula IV in which $R_3'=R_3''$ results. The quantitative ratio of the compounds in the product to some extent depends on the types of the starting material and the solvent, but generally when the reaction temperature is relatively low or the reaction time is short, the formation ratio of the 3-sulfonyl compound tends to be the greater, and conversely when the reaction temperature is relatively high or the reaction time, long, the formation ratio of 1,3-disulfonyl compound tends to become the higher. The 3-sulfonyl compound and the 1,3-disulfonyl compound can be separated with ease by recrystallization from suitable solvent such as methanol, ethanol, benzene and mixtures thereof.

Similar result can be obtained by, instead of reacting an alkali metal salt of the hydantoin of Formula V with the above-defined sulfonyl halide, first reacting the hydantoin of Formula V with equimolar amount of hydroxide, hydride, amide or alcoholate of alkali metal (e.g. sodium hydroxide, potassium hydroxide, sodium hydride, lithium hydride, sodium amide and sodium ethylate) and thereafter reacting the reaction product with the above-defined sulfonyl halide.

Examples of the dehydrohalogenation agent suitable to be used for the direct condensation of the hydantoin of Formula V with the said sulfonyl halide include pyridine analogue such as pyridine, picoline and lutidine; and aliphatic tertiary amine such as trimethyl amine, triethylamine, tri-n-propylamine and tri-n-butylamine.

In case the hydantoin of Formula V and the sulfonyl halide are condensed by the action of the pyridine analogue as the dehydrohalogenation agent, advantageously about 1 mol part of the hydantoin is reacted with about 1–1.5 mol parts of the sulfonyl halide in 1–15 mols of the pyridine analogue. Whereas, it is also possible to perform the condensation in a solvent such as benzene and xylene. The pyridine analogue is used preferably in anhydrous state. Although the reaction does progress at room temperature, it is advantageously performed by 30 minutes–3 hours' heating on a water bath. With this method chiefly the 3-sulfonyl compound of Formula III is obtained.

The condensation of the hydantoin of Formula V with the sulfonyl halide in the presence of the aliphatic tertiary amine is conveniently performed in a solvent such as acetone, benzene and xylene. In that case, about 2–4 mols of the sulfonyl halide and about 2–4 mols of the tertiary amine per mol of the hydantoin of Formula V are used with advantage. This condensation reaction progresses at room temperature, and completes within particularly short time in acetone. In case benzene or xylene is employed as the solvent, the reaction is performed advantageously by 2–3 hours' heating on a water bath. In accordance with this method, chiefly the 1,3-disulfonyl compound of Formula IV in which $R_3'=R_3''$ is obtained with high yield.

The 1,3-disulfonyl compound of Formula IV in which $R_3' \neq R_3''$ can be prepared by reacting the 3-sulfonyl compounds of the formula

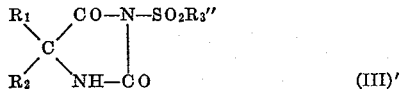
(III)' with the sulfonyl halide of the Formula $XSO_2R_3'$ in the presence of an aliphatic teritary amine, preferably in an organic solvent. In that case, it is advantageous to use about 1–2 mols of the sulfonyl halide and about 1–2 mols of the tertiary amine per mol of the 3-sulfonyl compound of Formula III'.

The novel compounds of the invention can be isolated from the reaction mixture in the form of their salts. Whereas, the free 1-sulfonyl compounds of Formula I can be converted to their salts with pharmaceutically acceptable bases by the means known per se. As examples of suitable bases, for instance hydroxides of alkali metals such as sodium hydroxide may be named.

As to some of the specific compounds within the invention, their pharmacological activities were compared with those of the known medicines, with the results illustrated in the following tables.

(1) *Anti-inflammatory effects.*—The anti-inflammatory activity of the compounds listed in Table 1 was tested using mouse hind paw edema method. In each run and in the control run six mice were employed. 0.05 ml. of 10% yeast or carrageenin suspension was injected into the paw of its hind leg of the animal. After 3 hours the hind legs of the mouse were cut off from the articulation, and the weight (R) of the leg which received the yeast suspension or carrageenin injection and the weight (L) of the leg which did not receive the injection were measused. From the values of R, L, and the body weight (B.W.) of the mouse, percent increase was calculated in accordance with the following equation.

$$\text{Percent increase} = \frac{R-L}{L} \times \frac{B.W.}{20} \times 100$$

From the average percent increase (A) of the test group and the average percent increase (B) of the control group, percent inhibition was calculated in accordance with the equation below.

$$\text{Percent inhibition} = \frac{B-A}{B} \times 100$$

The compound to be tested was orally administered to the test animals 30 minutes preceding the injection of yeast or carrageenin suspension.

The test results are shown in Table I.

TABLE I.—ANTI-INFLAMMATORY EFFECTS OF COMPOUNDS ON THE MOUSE HIND PAW EDEMA INDUCED WITH YEAST OR CARRAGEENIN SUSPENSION

| Compounds 1mµ/kg. p.o. | Inhibition in percent of edema | |
|---|---|---|
|  | Yeast | Carrageenin |
| 1-benzenesulfonyl-5,5-diphenyl hydantoin | 51.8 | 42.4 |
| 1-ethanesulfonyl-5,5-diphenyl hydantoin | 39.9 | 28.7 |
| 1-p-nitrobenzenesulfonyl-5-ethyl-5-phenylhydantoin | 43.7 | 34.9 |
| Phenylbutazone | 33.5 | 27.7 |
| Aminopyrine | 30.4 | 24.0 |
| Aspirin | 18.6 | 28.4 |
| Ibufenac | 20.3 | 19.4 |

From the above Table I it can be understood that the compounds of the invention exhibit excellent anti-inflammatory activity compared with known anti-inflammatory agents.

(2) *Anti-exudative activity.*—Anti-exudative activity of the medicines indicated in Table II was measured. In each run and in the control run, six male rats of Wistar strain were employed.

Into each test animal 25 ml. of $N_2$ gas injected at the back to form an air-bladder in situ, into which 1 ml. of 1% croton oil was injected. The medicine of the indicated dosage was daily given to the test animals by oral administration for a period of week. The volume of the exudate in the air-bladder was measured one week later. From the average exudate volume V ml. of the test animals and that of the control group, 9.53±1.16 ml., percent inhibition was calculated in accordance with the equation below.

$$\text{Percent inhibition} = \frac{9.53 \pm 1.16 - V}{9.53 \pm 1.16} \times 100$$

Body weights of the tested animals before and after the dosage were also measured. The test resuts are shown in Table II.

TABLE II.—ANTI-EXUDATIVE EFFECT IN RATS

| Compound | No. of rats | Dose, mg./kg. daily p.o. | Exudative Volume, ml.±s.e. | Inhibition, percent | Body wt. (g.) Before/final |
|---|---|---|---|---|---|
| Control | 6 | 0 | 9.53±1.16 | 0 | 183/231 |
| 1-benzenesulfonyl-5,5-diphenylhydantoin | 6 | 3 | 7.42±1.88 | 22.1 | 176/214 |
|  | 6 | 10 | 7.45±1.37 | 21.3 | 173/204 |
|  | 6 | 16.7 | 4.63±1.05 | 51.4 | 186/236 |
|  | 6 | 50 | 4.53±1.33 | 52.5 | 186/214 |
|  | 6 | 150 | 3.22±0.61 | 66.2 | 183/180 |
| Phenylbutazone | 6 | 10 | 7.30±1.99 | 22.4 | 178/217 |
|  | 6 | 50 | 2.90±1.04 | 69.6 | 185/174 |
|  | 6 | 100 | 2.80±0.32 | 71.9 | 167/142 |
|  | 6 | 200 | 1.70±1.21 | 83.0 | 148/105 |
| Aspirin | 6 | 300 | 10.16±1.76 | -1.9 | 156/201 |

From the Table II is can be understood that 1-benzenesulfonyl - 5,5 - diphenyl hydantoin have anti-exudative activity much more powerful than that of aspirin and about equal to that of phenylbutazone. Table II again demonstrates that from the standpoint of reduction in body weight, 1 - benzenesulfonyl - 5,5 - diphenyl hydantoin is preferable over phenylbutazone.

(3) *Antipyretic activity.*—Antipyretic activity of the medicines indicated in Table III was measured. Among the male rates of Wistar strain weighing 160–220 g., those of about the same body temperature were selected and tested. Into the test animals 1 ml./100 g. body weight of 15% yeast suspension was subcutaneously injected, and to the feverish rats, the medicine of the indicated dosage was orally administered at 16 hours after the injection of the yeast suspension. The body temperature of the tested animal was measured every hour to the total of six times before the yeast injection, at the time of the medicine administration and after the administration. The test results are shown in Table III, in which "decrease" signifies the maximum decrease in body temperature since the time of the medicine administration.

TABLE III.—ANTI-PYRETIC EFFECT IN RATS

| Compound | No. of rats | Dose, mg./kg. p.o. | Pre-/post-yeast | Decrease |
|---|---|---|---|---|
| Control | 9 | 0 | 37.0/38.1 | 0.15±0.07 |
| 1-benzenesulfonyl-5,5-diphenyl hydantoin | 5 | 30 | 36.8/38.5 | 0.37±0.09 ($P<0.05$) |
|  | 5 | 100 | 37.2/38.1 | 1.10±0.16 ($P<0.01$) |
|  | 5 | 200 | 36.8/37.9 | 1.35±0.21 ($P<0.01$) |
| Aspirin | 5 | 30 | 37.0/38.3 | 0.44±0.15 ($P>0.05$) |
|  | 5 | 100 | 37.1/38.6 | 0.82±0.15 ($P<0.01$) |
|  | 5 | 200 | 37.1/38.4 | 0.88±0.19 ($P<0.01$) |
| Phenylbutazone | 5 | 30 | 37.4/38.1 | 0.54±0.18 ($P<0.05$) |
|  | 4 | 100 | 36.9/38.2 | 0.79±0.20 ($P<0.05$) |
|  | 5 | 200 | 37.5/38.4 | 1.03±0.19 ($P<0.05$) |
| Aminopyrine | 5 | 100 | 37.4/38.2 | 1.00±0.17 ($P<0.01$) |
|  | 5 | 200 | 37.0/38.1 | 1.16±0.13 ($P<0.01$) |

NOTE.—P = probability values.

From the Table III, is can be understood that 1-benzenesulfonyl-5,5-diphenyl hydantoin has equal or superior antipyretic activity compared with known antipyretics, aspirin, phenylbutazone and aminopyrine.

(4) *Gastro-intestinal disturbance and acute toxicity.*— To male mongrel dogs, 1 to 1.5 years of age, of this laboratory-breed, the medicine was orally administered as capsule. None of the five dogs administered with 100 mg./kg. body weight of 1-benzenesulfonyl-5,5-diphenyl hydantoin showed any symptom suggesting gastro-intestinal disturbance during the week following, but the two dogs administered with 100 mg./kg. body weight of phenylbutazone showed weak emesis during 1–2 days immediately following the administration, and decrease of appetite was observed for 3 days.

$LD_{50}$ (a week's value) of 1 - benzenesulfonyl - 5,5-diphenyl hydantoin employing male dd-mice was as weak as 1700 mg./kg. in case of oral administration, and 1037 mg./kg. in case of intraperitoneal injection.

The compounds of the invention presumably are highly uesful as an anti-inflammatory agent, antipyretic and analgesic. Appropriate dosage for administration probably will be about 200–600 mg./kg. body weight per day for adult.

EXAMPLE 1

Preparation of 3-ethanesulfonyl-5,5-diphenyl hydantoin and 1,3-diethanesulfonyl-5,5-diphenyl hydantoin To a suspension of 27.4 g. of sodium salt of 5,5-diphenyl hydantoin in 250 ml. of absolute benzene, 14 g. of ethanesulfonyl chloride was added, and the system was stirred for 30 minutes at room temperature. After following 5 minutes' reflux, benzene was distilled off under reduced pressure. Adding water to the residue, the insoluble matter was recrystallized from diluted ethanol, whereby 12.0 g. of 3-ethanesulfonyl-5,5-diphenyl hydantoin was obtained as white needles having a melting point of 150–151° C.

When the above reaction was performed with an hour's reflux followed by the similar treatments and the insoluble matter was recrystallized from a mixed solvent of benzene and ether, 15.0 g. of 1,3-diethanesulfonyl-5,5-diphenyl hydantoin was obtained as white needles having a melting point of 185–186° C.

EXAMPLE 2

Preparation of 3-benzenesulfonyl-5-ethyl-5-phenyl hydantoin and 1,3-dibenzenesulfonyl-5-ethyl-5-phenyl hydantoin 22.6 grams of sodium salt of 5-ethyl-5-phenyl hydantoin and 23.7 g. of benzenesulfonyl chloride were refluxed for 30 minutes in 200 ml. of absolute benzene. Benzene was distilled off and the residue was washed with water. Recrystallizing the insoluble matter from methanol, 17.2 g. of 3-benzenesulfonyl-5-ethyl-5-phenyl hydantoin was obtained as white needles having a melting point of 190.5–191.5° C.

Performing the above reaction with 4 hours' reflux followed by the similar treatments, 7.2 g. of 1,3-dibenzenesulfonyl-5-ethyl-5-phenyl hydantoin was obtained as white needles having a melting point of 173–175° C.

Similarly the following compounds were obtained:

3-ethanesulfonyl-5,5-dimethyl hydantoin
  melting point 172–174° C.
1,3-diethanesulfonyl-5,5-dimethyl hydantoin
  melting point 151–153° C.
3-benzenesulfonyl-5,5-dimethyl hydantoin
  melting point 168–170° C.
1,3-dibenzenesulfonyl-5,5-dimethyl hydantoin
  melting point 172–174° C.

EXAMPLE 3

Preparation of 3-(p-nitrobenzenesulfonyl)-5,5-dimethyl hydantoin and 1,3-di-(p-nitrobenzenesulfonyl)-5,5-dimethyl hydantoin 15.0 grams of sodium salt of 5,5-dimethyl hydantoin and 24 g. of p-nitrobenzenesulfonyl chloride were stirred for 30 minutes at room temperature in 150 ml. of ethanol, and then heated for 5 minutes on a boiling water bath. After the reaction ethanol was distilled off under reduced pressure, and to the residue water was added. Recrystallizing the insoluble matter from ethyl acetate, 5.3 g. of 1,3-di-(p-nitrobenzenesulfonyl)-5,5 - dimethyl hydantoin was obtained as white needles having a melting point of 262–263° C.

Then the mother liquid of the above ethyl acetate recrystallization was concentrated and the residue was recrystallized from methanol to produce 8.5 g. of 3-(p-nitrobenzenesulfonyl)-5,5-dimethyl hydantoin as white needles having a melting point of 202–205° C.

Similarly the following compounds were obtained:

3-benzenesulfonyl-5,5-diphenyl hydantoin
  melting point 203–204° C.
1,3-dibenzenesulfonyl-5,5-diphenyl hydantoin
  melting point 233–234° C.

EXAMPLE 4

Preparation of 3-ethanesulfonyl-5,5-pentamethylene hydantoin

To a suspension of 16.8 g. of 5,5-pentamethylene hydantoin in 200 ml. of n-hexane, 2.4 g. of sodium hydride was added, and the system was heated under reflux for 2 hours. Then to the reaction mixture 15 g. of ethanesulfonyl chloride was added followed by about 10 minutes' heating under reflux. n-Hexane was distilled off and the residue was washed with water and recrystallized from diluted ethanol to yield 12.0 g. of the object product as white needles having a melting point of 146–148° C.

Similarly the following compounds were obtained:

3-ethansulfonyl-5-ethyl-5-phenyl hydantoin
  oily substance
3-benzenesulfonyl-5,5-pentamethylene hydantoin
  melting point 191–193° C.
3-(p-nitrobenzenesulfonyl)-5,5-diphenyl hydantoin
  melting point 195–196° C.
3-(p-nitrobenzenesulfonyl)-5-ethyl-5-phenyl hydantoin
  melting point 205–207° C.
3-(p-toluenesulfonyl)-5,5-diphenyl hydantoin
  melting point 228–230° C.
3-(p-toluenesulfonyl)-5-ethyl-5-phenyl hydantoin
  melting point 182–183° C.
3-(p-acetaminobenzenesulfonyl)-5,5-diphenyl hydantoin
  melting point 228–231° C.

EXAMPLE 5

Preparation of 3-benzenesulfonyl-5,5-diphenyl hydantoin

25.2 grams of 5,5-diphenyl hydantoin and 22.6 g. of benzenesulfonyl chloride were added into 50 ml. of pyridine, and the mixture was heated for 2 hours on a water bath. Pyridine was then distilled off under reduced pressure, and to the residue water was added. The crystal precipitated upon making the system acidic with hydrochloric acid was separated by filtration, washed with water and recrystallized from ethanol to yield 31.0 g. of the object product as white needles having a melting point of 203–204° C.

EXAMPLE 6

Preparation of 3-(p-toluenesulfonyl)-5,5-diphenyl hydantoin

25.2 grams of 5,5-diphenyl hydantoin and 19.1 g. of p-toluenesulfonyl chloride were added into 40 ml. of pyridine, and the mixture was heated for 2 hours on a water bath, followed by the similar treatments as in Example 5. The resultant crude crystal was recrystallized from dioxane to yield 30 g. of the object product as white needles having a melting point of 228–230° C.

Similarly the following compounds were obtained:

3-(p-methoxybenzenesulfonyl)-5,5-diphenyl hydantoin
melting point 186–188° C.
3-(p-chlorobenzenesulfonyl)-5,5-diphenyl hydantoin
melting point 170–171° C.
3-(p-benzyloxybenzenesulfonyl)-5,5-diphenyl hydantoin
melting point 221–223° C.
3-(m-nitrobenzenesulfonyl)-5,5-diphenyl hydantoin
melting point 222–224° C.

EXAMPLE 7

Preparation of 1,3-dibenzenesulfonyl-5,5-diphenyl hydantoin

Into 200 ml. of absolute benzene, 25.2 g. of 5,5-diphenyl hydantoin, 50 g. of benzenesulfonyl chloride and 40 g. of triethylamine were added, and the mixture was heated for 1.5 hours under reflux. Thereafter the benzene was distilled off, and the residue added with water was made acidic with hydrochloric acid. The crude crystal thereupon precipitated was separated by filtration, and washed with cold 5% aqueous sodium hydroxide, and with water, followed by recrystallization from dioxane. Whereupon 45 g. of the object product as white needles having a melting point of 233–234° C. was obtained.

EXAMPLE 8

Preparation of 1,3-di-(p-methoxybenzenesulfonyl)-5,5-diphenyl hydantoin

Into 200 ml. of absolute benzene, 25.2 g. of 5,5-diphenyl hydantoin, 57 g. of p-methoxybenzenesulfonyl chloride and 40 g. of triethylamine were added, and the mixture was heated for 2 hours under reflux. Treating the reaction matter in the similar manner as in Example 7, 50 g. of the object product was obtained as white needles having a melting point of 240–242° C.

Similarly the following compounds were obtained:

1,3-di-(p - chlorobenzenesulfonyl)-5,5-diphenyl hydantoin
melting point 268–271° C.
1,3-di-(m - nitrobenzenesulfonyl)-5,5-diphenyl hydantoin
melting point 243–245° C.
1,3-di-(o-toluenesulfonyl)-5,5-diphenyl hydantoin
melting point 196–199° C.
1,3-di-(p-benzyloxybenzenesulfonyl)-5,5-diphenyl hydantoin
melting point 196–199° C.

EXAMPLE 9

Preparation of 1,3-dibenzenesulfonyl-5,5-diphenyl hydantoin

Into 200 ml. of absolute acetone, 39.6 g. of 3-benzenesulfonyl-5,5-diphenyl hydantoin, 20 g. of benzenesulfonyl chloride and 3.0 g. of triethylamine were added, and the mixture was heated for about 10 minutes on a water bath. The crystal precipitated was separated by filtration, washed with water and then with acetone, and was recrystallized from dioxane to yield 40 g. of the object product as white needles having a melting point of 233–234° C.

Similarly the following compound was obtained:

1-benzenesulfonyl-3-(p - methoxybenzenesulfonyl)-5,5-diphenyl hydantoin
melting point 235–237° C.

EXAMPLE 10

Preparation of 1-ethanesulfonyl-5,5-diphenyl hydantoin

34.4 grams of 3-ethanesulfonyl-5,5-diphenyl hydantoin was suspended in 200 ml. of absolute benzene, and to the suspension 2.4 g. of sodium hydride was added, followed by 2 hours' reflux. After the reaction the benzene was distilled off, and the residue was treated with diluted hydrochloric acid. Recrystallizing the insoluble matter from diluted ethanol, 27.5 g. of the object product was obtained as white needles having a melting point of 205–207° C.

EXAMPLE 11

Preparation of 1-benzenesulfonyl-5-ethyl-5-phenyl hydantoin

Example 10 was repeated except that 34.4 g. of 3-benzenesulfonyl-5-ethyl-5-phenyl hydantoin was used as the starting material. Whereby 15.0 g. of the object product was obtained as white needles (recrystallized from methanol) having a melting point of 98–100° C.

EXAMPLE 12

Preparation of 1-(p-nitrobenzenesulfonyl)-5,5-dimethyl hydantoin

Example 10 was repeated except that 31.3 g. of 3-(p-nitrobenzenesulfonyl)-5,5-dimethyl hydantoin was used as the starting material. Whereby 18.5 g. of the object product was obtained as white needles (recrystallized from diluted methanol) having a melting point of 215–217° C.

Similarly the following compounds were obtained:

1-ethanesulfonyl-5-ethyl-5-phenyl hydantoin
melting point 163–164° C.
1-benzenesulfonyl-5,5-diphenyl hydantoin
melting point 221–222° C.
1-ethanesulfonyl-5,5-dimethyl hydantoin
melting point 190–192° C.
1-ethanesulfonyl-5,5-pentamethylene hydantoin
melting point 247–249° C.
1-benzenesulfonyl-5,5-dimethyl hydantoin
melting point 202–204° C.
1-benzenesulfonyl-5,5-pentamethylene hydantoin
metling point 245–246° C.
1-(p-nitrobenzenesulfonyl)-5-ethyl-5-phenyl hydantoin
melting point 204–205° C.
1-(p-toluenesulfonyl)-5,5-diphenyl hydantoin
melting point 265–267° C.
1-(p-toluenesulfonyl)-5-ethyl-5-phenyl hydantoin
melting point 109–111° C.

EXAMPLE 13

Preparation of 1-(p - nitrobenzenesulfonyl)-5,5-diphenyl hydantoin and 1 - (p - aminobenzenesulfonyl)-5,5-diphenyl hydantoin

To a suspension of 4.3 g. of 3-(p-nitrobenzenesulfonyl)-5,5-diphenyl hydantoin in 50 ml. of absolute toluene, 0.25 g. of sodium hydride was added, followed by the treatments as in Example 11. Whereby 2.8 g. of 1-(p-nitrobenzenesulfonyl)-5,5-diphenyl hydantoin as pale yellow needles having a melting point of 220–222° C. was obtained.

Five (5) g. of the above 1-(p-nitrobenzenesulfonyl)-5,5-diphenyl hydantoin was dissolved in 100 ml. of ethanol, and the solution was subjected to catalytic reduction in the conventional manner employing palladium-carbon catalyst. After the reaction the catalyst was removed by filtration, and the filtrate was concentrated. Recrystallizing the resultant residue from dilued ethanol, 2.5 g. of 1-(p-aminobenzenesulfonyl)-5,5-diphenyl hydantoin as white needles having a melting point of 276–278° C. was obtained.

Similarly from 1-(p-benzyloxybenzenesulfonyl)-5,5-diphenyl hydantoin, 1-(p-hydroxybenzenesulfonyl)-5,5-diphenyl hydantoin as white needles having a melting point of 263–265° C. was obtained.

EXAMPLE 14

Preparation of 1-benzenesulfonyl-5,5-diphenyl hydantoin (a) 53 grams of 1,3-dibenzenesulfonyl-5,5-diphenyl hydantoin was added into 200 ml. of 4% aqueous sodium hydroxide, and the suspension was heated on a water bath for about 30 minutes with stirring. The resultant transparent solution was made acidic with hydrochloric acid, and the crystal whereupon precipitated was separated by filtration, washed with diluted aqueous sodium carbonate, and recrystallized from ethanol to yield 20 g. of the object product as white needles having a melting point of 221–222° C.

(b) 50 grams of 1,3-dibenzenesulfonyl-5,5-diphenyl hydantoin was added into a mixture consisting of 50 ml. of conc. hydrochloric acid and 50 ml. of ethanol, and the system was heated at 150–170° C. for 4 hours in an autoclave and cooled. The crystal precipitated was separated by filtration and recrystallized from methanol to yield 37 g. of the object product as white needles having a melting point of 221–222° C.

EXAMPLE 15

Preparation of 1-(p-methoxybenzenesulfonyl)-5,5-diphenyl hydantoin

Into 500 ml. of ethanol, 59.0 g. of 1,3-di-(p-methoxybenzene-sulfonyl)-5,5-diphenyl hydantoin and 17.0 g. of diethylamine were added, and the mixture was heated for 30 minutes under reflux. Then the ethanol was distilled off, and to the residue diluted hydrochloric acid was added. The crystal whereupon precipitated was separated by filtration and recrystallized from methanol to yield 30 g. of the object product as white needles having a melting point of 267–268° C.

Similarly the following compounds were obtained:

1-(p-chlorobenzenesulfonyl)-5,5-diphenyl hydantoin melting point 250–251° C.

1-(p-benzyloxybenzenesulfonyl)5,5-diphenyl hydantoin melting point 228–230° C.

1-(m-nitrobenzenesulfonyl)-5,5-diphenyl hydantoin melting point 253–255° C.

1-(o-toluenesulfonyl) - 5,5 - diphenyl hydantoin melting point 223–225° C.

EXAMPLE 16

Preparation of 1-benzenesulfonyl-3-methyl-5,5-diphenyl hydantoin 3.9 grams of 1-benzenesulfonyl-5,5-diphenyl hydantoin was dissolved in 1000 ml. of 0.2% aqueous sodium hydroxide, and to which 4 g. of dimethyl sulfate was slowly dropped under agitation while the system was maintained cold. The resultant solution was stirred for 2 hours and the precipitated crystal was separated by filtration and recrystallized from methanol to yield 2.5 g. of the object product as white needles having a melting point of 213–215° C.

EXAMPLE 17

Preparation of 1-benzenesulfonyl-3-ethoxycarbonyl-5,5-diphenyl hydantoin

In 500 ml. of absolute benzene, 34 g. of 1-benzenesulfonyl-5,5-diphenyl hydantoin was suspended, and to the suspension 2.5 g. of sodium hydride was added. The mixture was then heated for an hour on a water bath under agitation and added with 15 g. of ethyl chloroformate followed by another hour's heating under reflux. Benzene was distilled off, and the residue was added with water and extracted with ether. The ether extract was concentrated, and the resultant residue was recrystallized from ethanol to yield 20 g. of the object product as white needles having a melting point of 153–155° C.

EXAMPLE 18

Preparation of 1-benzenesulfonyl-3-acetyl-5,5-diphenyl hydantoin 5.0 grams of 1-benzenesulfonyl-5,5-diphenyl hydantoin was added to 20 ml. of acetic anhydride, and heated for 2 hours under reflux. The residue obtained after evaporation under reduced pressure was dissolved in benzene, and into petroleum ether was poured. Separating the whereupon precipitated crystal by filtration, 3.0 g. of the object product as white needles having a melting point of 172–175° C. was obtained.

We claim:

1. A compound selected from the group consisting of 1-sulfonyl-5,5-disubstituted hydantoins of the formula

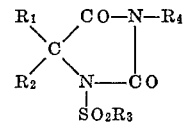

wherein $R_1$ and $R_2$ each represents a member selected from phenyl and lower alkyl having 1 to 4 carbon atoms, $R_1$ and $R_2$ when taken together forming a 5- or 6-membered cycloaliphatic ring with the carbon atom at 5-position of the hydantoin nucleus, with the proviso that $R_1$ and $R_2$ may not both be methyl; $R_3$ represents a member selected from lower alkyl having 1 to 4 carbon atoms, phenyl and substituted phenyl, said substituent on the phenyl being selected from lower alkyl having 1 to 4 carbon atoms, nitro, halogen, amino, hydroxy, lower alkoxy having 1 to 4 carbon atoms and phenylalkoxy in which the alkoxy moiety has 1 to 2 carbon atoms; and $R_4$ represents a member selected from hydrogen, lower alkyl having 1 to 4 carbon atoms, lower alkanoyl having 2 to 5 carbon atoms, benzoyl and alkoxycarbonyl having 2 to 5 carbon atoms and their salts with pharmaceutically acceptable bases.

2. The 1-sulfonyl-5,5-disubstituted hydantoin of claim 1 wherein the compound is 1-benzenesulfonyl-5,5-diphenyl hydantoin.

3. The 1-sulfonyl-5,5-disubstituted hydantoin of claim 1 wherein the compound is 1-(p-chlorobenzenesulfonyl)-5,5-diphenyl hydantoin.

4. The 1-sulfonyl-5,5-disubstituted hydantoin of claim 1 wherein the compound is 1-(p-hydroxybenzenesulfonyl)-5,5-diphenyl hydantoin.

5. The 1-sulfonyl-5,5-disubstituted hydantoin of claim 1 wherein the compound is 1-(p-toluenesulfonyl)-5,5-diphenyl hydantoin.

6. The 1-sulfonyl-5,5-disubstituted hydantoin of claim 1 wherein the compound is 1-(p-methoxybenzenesulfonyl)-5,5-diphenyl hydantoin.

7. The 1-sulfonyl-5,5-disubstituted hydantoin of claim 1 wherein the compound is 1-(p-nitrobenzenesulfonyl)-5,5-diphenyl hydantoin.

8. The 1-sulfonyl-5,5-disubstituted hydantoin of claim 1 wherein the compound is 1-(m-nitrobenzenesulfonyl)-5,5-diphenyl hydantoin.

9. The 1-sulfonyl-5,5-disubstituted hydantoin of claim 1 wherein the compound is 1-(o-toluene sulfonyl)-5,5-diphenyl hydantoin.

10. The 1-sulfonyl-5,5-disubstituted hydantoin of claim 1 wherein the compound is 1-(p-aminobenzenesulfonyl)-5,5-diphenyl hydantoin.

11. The 1-sulfonyl-5,5-disubstituted hydantoin of claim 1 wherein the compound is 1-ethanesulfonyl-5,5-diphenyl hydantoin.

12. The 1-sulfonyl-5,5-disubstituted hydantoin of claim 1 wherein the compound is 1-(p-benzyloxybenzenesulfonyl)-5,5-diphenyl hydantoin.

13. The 1-sulfonyl-5,5-disubstituted hydantoin of claim 1 wherein the compound is 1-benzenesulfonyl-5-ethyl-5-phenyl hydantoin.

14. The 1-sulfonyl-5,5-disubstituted hydantoin of claim 1 wherein the compound is 1-(p-nitrobenzenesulfonyl)-5-ethyl-5-phenyl hydantoin.

15. The 1-sulfonyl-5,5-disubstituted hydantoin of claim 1 wherein the compound is 1(p-toluene sulfonyl)-5-ethyl-5-phenyl hydantoin.

16. The 1-sulfonyl-5,5-disubstituted hydantoin of claim 1 wherein the compound is 1-ethanesulfonyl-5-ethyl-5-phenyl hydantoin.

17. The 1-sulfonyl-5,5-disubstituted hydantoin of claim 1 wherein the compound is 1-(p-nitrobenzenesulfonyl)-5,5-dimethyl hydantoin.

18. The 1-sulfonyl-5,5-disubstituted hydantoin of claim 1 wherein the compound is 1-ethanesulfonyl-5,5-dimethyl hydantoin.

19. The 1-sulfonyl-5,5-disubstituted hydantoin of claim 1 wherein the compound is 1-benzenesulfonyl-5,5-pentamethylene hydantoin.

20. The 1-sulfonyl-5,5-disubstituted hydantoin of claim 1 wherein the compound is 1-ethanesulfonyl-5,5-pentamethylene hydantoin.

References Cited

UNITED STATES PATENTS 3,161,652  12/1964  Takamatsu et al. ___ 260—309.5

OTHER REFERENCES

Lampson et al.: CA 51:3, 751–2 (March 1957).
Bengelsdorf: J.A.C.S. 75:3138–40 (1953).

HENRY R. JILES, Primary Examiner

C. M. SHURKO, Assistant Examiner

U.S. Cl. X.R.

260—309.5; 424—229, 273